Aug. 14, 1945.    M. WALTER    2,382,836
TRANSPORTABLE GUN MOUNT
Filed Nov. 13, 1941    3 Sheets-Sheet 2
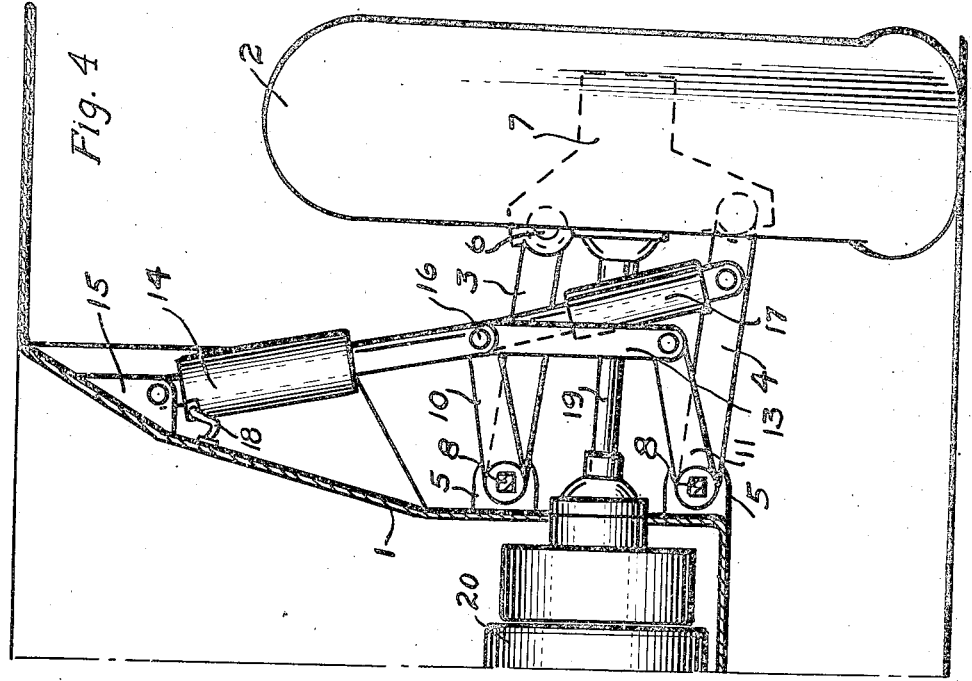
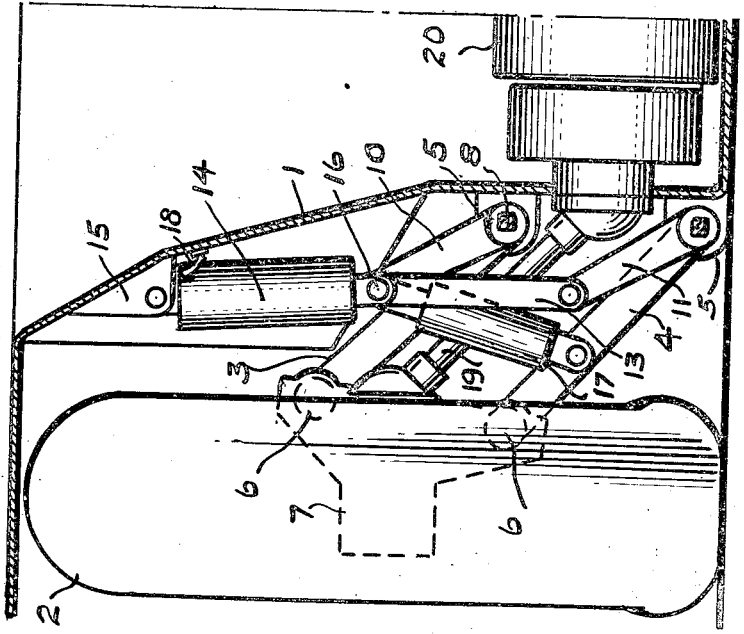
INVENTOR.
Maurice Walter

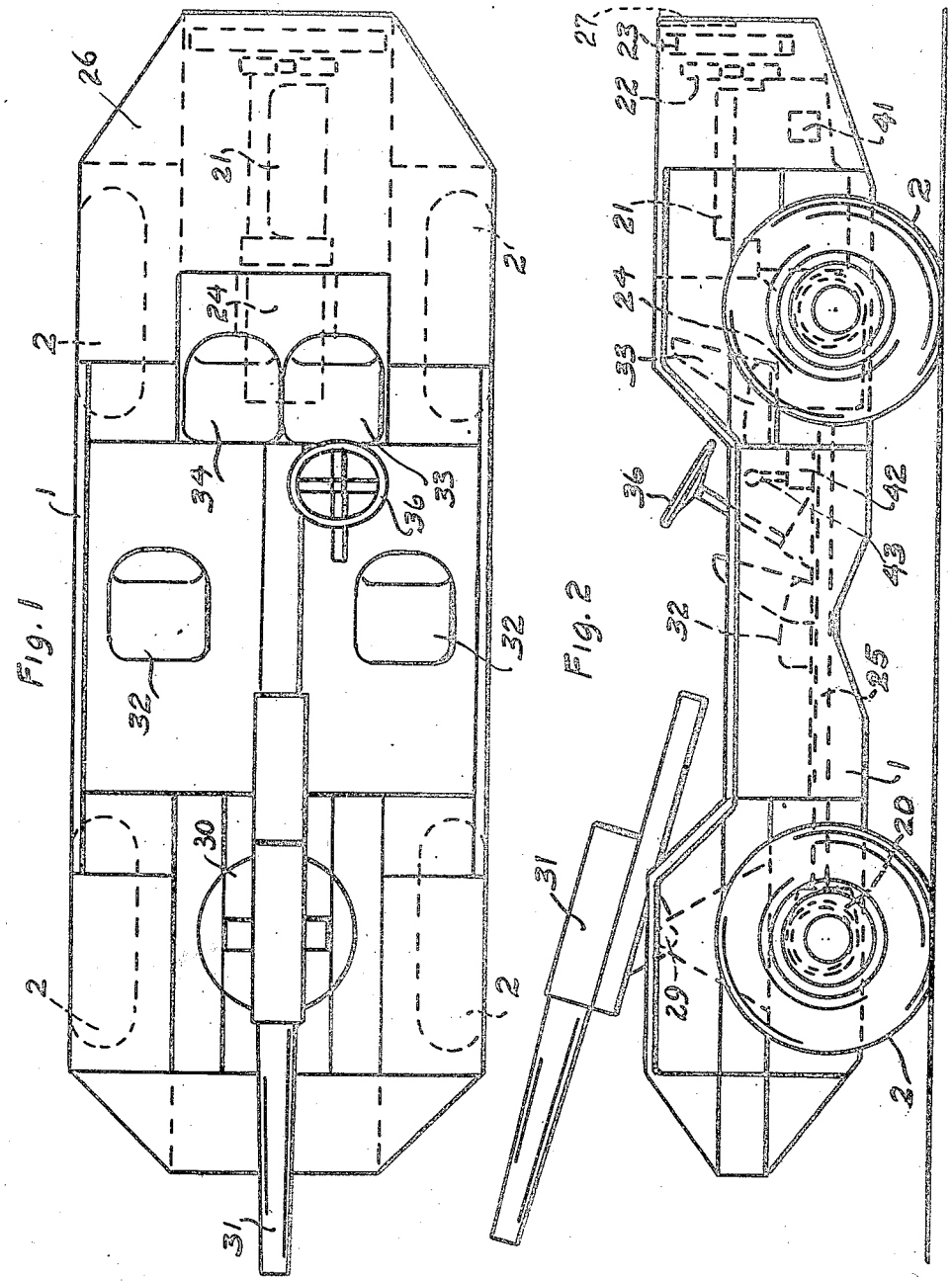

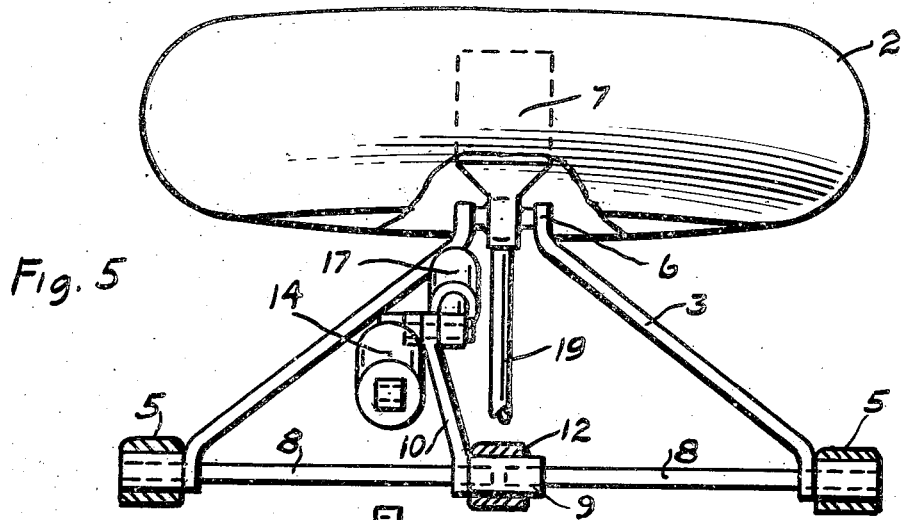
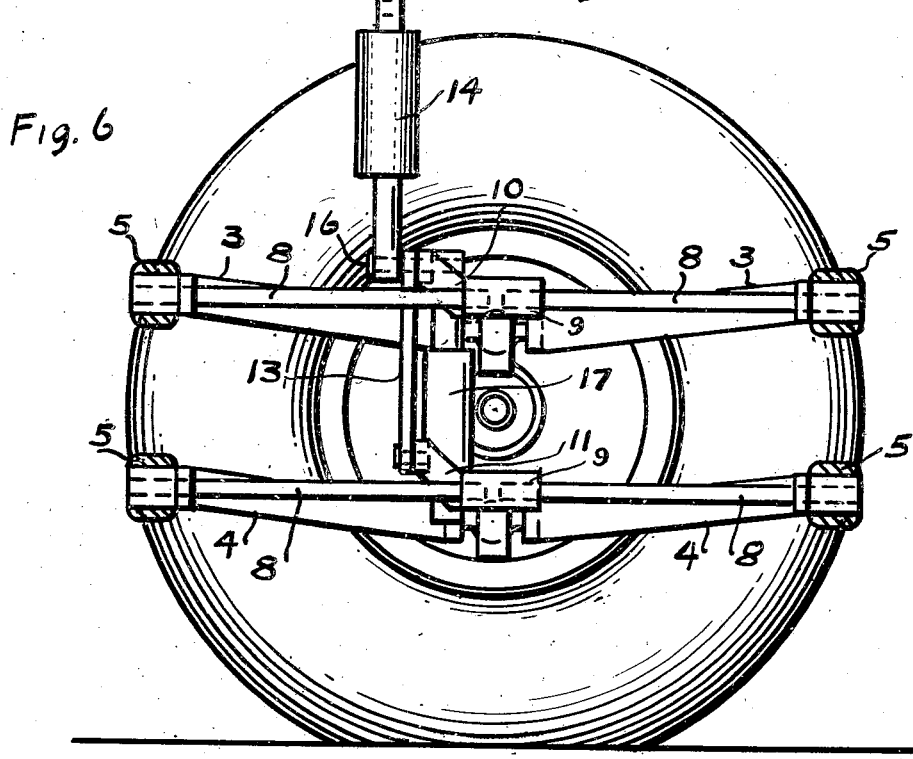

Patented Aug. 14, 1945

2,382,836

UNITED STATES PATENT OFFICE 2,382,836

TRANSPORTABLE GUN MOUNT

Maurice Walter, Atlantic Beach, N. Y.

Application November 13, 1941, Serial No. 418,903

9 Claims. (Cl. 89—40)

This invention relates to vehicles and more particularly to a vehicle of a character particularly adaptable as a transportable gun mount which may be drawn or self-propelled.

One of the objects of the invention is to provide a vehicle adaptable as a gun mount which is highly mobile and which when stationary can quickly be made to provide a substantially solid firing foundation for the gun.

Another object of the invention is to provide a gun supporting vehicle adapted to protect the gun or guns mounted thereon, the crew and their equipment from water during the fording of streams or other bodies of water.

A further object of the invention is to provide a sturdy, highly maneuverable, self-propelled gun mount.

Other objects of the invention are to provide strong, sturdy independent wheel suspension for vehicles; a wheel suspension which has great shock absorbing qualities capable of greatly minimizing pitching or rolling or bouncing the body of the vehicle even when the vehicle is negotiated over rough terrain at high speeds; and means associated with the wheel suspension by which the frame or body of the vehicle can be readily raised or lowered relative to the wheels.

The above and additional objects of the invention are obtained by the provision of a sturdy vehicle frame or body having means on which one relatively heavy gun together with lighter guns can be mounted and fired while the vehicle is either in motion or stationary. The body of the vehicle is box-like in construction having a closed bottom and relatively high watertight side and end walls relatively heavily armored and is supported by independent wheel suspension. The mount for the gun or guns is preferably located over the front wheels while the motor or other power unit and ordnance are located at and/or rearwardly of the back wheels, thus presenting a weight balanced vehicle and one in which the gun is foremost with the source of motivating power substantially protected at the rear thereof.

In some installations the vehicle may be of trailer character to be drawn by any suitable source of power, such as a tractor, truck, tank, etc. Where the gun mount comprises a trailer, the gun will of course be located near the center of the vehicle.

The wheel suspension for the vehicle is provided with a plurality of sturdy spring torsion rods to provide ample resilient support for the body and which, even should part of it be damaged or shot away, would most likely provide sufficient support to maintain the vehicle in transportable condition. Each wheel suspension is provided with a toggle and hydraulic means actuatable to lower and raise the body of the vehicle relative to the wheels so that the body may be lowered to the ground to provide a substantially solid firing foundation for the gun, and to be quickly raised therefrom for instant mobility.

For a better understanding of the invention, reference is to be had to the following detailed description to be read in connection with the accompanying diagrammatical drawings, in which:

Fig. 1 is a plan view of a vehicle shown with a gun mount constructed according to the present invention;

Fig. 2 is a view in vertical elevation of the vehicle shown in Fig. 1;

Fig. 3 is an end view of one of the wheels with the associated portion of the body shown in section to indicate the relative position of the parts thereof when the body is lowered to the ground;

Fig. 4 is an end view similar to that of Fig. 3 showing the body raised to its travelling position;

Fig. 5 is a view in plan of one of the wheels and the suspension connections therefor, and Fig. 6 is a view in vertical elevation of the inner side of the wheel and suspension means shown in Fig. 5.

Referring to Figs. 1 and 2 of the drawings a self-propelled transportable gun mount is shown for purposes of illustrating the invention. The gun mount comprises a box type frame or body 1 having a closed bottom and relatively high side and end walls of watertight construction. This box type construction is sturdy and provides considerable protection for the crew, gun, motor and other equipment from shell fire and also from water during the fording of streams and other bodies of water. The box-like body may be fabricated from sheets of steel or armor plate.

The four wheels 2 by which the body is supported are independently mounted thereon by upper and lower hinge arms 3 and 4 suitably journaled on the body by brackets 5 (Figs. 3 and 4). For the front wheels the outer ends or apices of the arms 3 and 4 are provided with double swivel or ball joints 6 located on the bearing yokes 7 of the wheels. For the rear wheels a single swivel joint is provided between the arms 3 and 4 and the bearing yokes of the rear wheels. If desired the rear wheels may be mounted with ball joints the same as illustrated in Figs. 3 and 4, whereby four-wheel steering may be had.

Referring to Figs. 3 to 6 of the drawings, the upper and lower brackets 5 on the body are shown provided with spring torsion bars 8. Four such torsion bars are provided for each wheel. Two levers 10 and 11 are secured to the torsion bars 8, each lever being connected by a hub 9 to two of the bars. The hubs 9 of the levers 10 and 11 which are secured to the bars 8 are additionally supported on the body 1 by suitable journals 12. The arms 3 and 4 are also connected to the end of the bars 8 at the brackets 5. It will be understood, however, that in place of two bars, a single bar may be provided with opposite ends journaled in two of the brackets 5 with the hub 9 connected at the center thereof and the two legs of a hinge arm connected thereto adjacent the ends thereof.

The levers 10 and 11 form parts of a toggle connection which include a link 13 pivotally connected to the free ends of the levers 10 and 11. A hydraulic cylinder 14 is connected at one end thereof to a bracket 15 on the side wall of the body 1 while the piston thereof is pivotally connected at 16 to the lever 10 and the link 13. A shock absorber 17 is connected at one end to the pivotal connection 16 and at the other end to one of the lower arms 4 adjacent to its connection to the bearing yoke 7. Thus arranged, the axes of the hydraulic cylinder and the shock absorber are substantially in alignment so that a considerable portion of the riding shock are absorbed thereby. The action of the torsion bars 8 interconnected between the arms 3, 4 and the levers 10, 11 carry the load. Thus supported, the body has high ground clearance and a very low overall height.

When the hydraulic pressure is released from the hydraulic cylinder 14 through a suitable conduit connection 18 the piston thereof recedes inwardly of the cylinder causing the toggle connections to swing upwardly and assume the position shown in Fig. 3. By the movement of the toggle the body is lowered relative to the wheels for solid contact with the ground. When it is desired to raise the body for transportation, hydraulic pressure is applied to the cylinders 14 thereby actuating the pistons thereof to lift the body relative to the wheels to a travelling position shown in Fig. 4. This operation is quick and can be controlled by the driver of the vehicle by merely opening the hydraulic pressure connections to the cylinders 14 when the body is to be lowered and to connect fluid under pressure to the cylinders when it is desirable to lift the body to travelling position. The control and source of hydraulic fluid with which the vehicle is provided is hereinafter described.

The body 1 may be supported by the wheels 2 for trailer operation or a suitable motor may be installed to propel the vehicle. Either two or four wheel drives may be provided. As shown in Figs. 3 and 4, universal drive shafts 19 are provided to transmit power to the front wheels from a motor 21 through a suitable drive 20.

Where the vehicle is provided with a motor for self-propulsion I prefer to locate it in the rear of the vehicle, preferably overhanging the rear wheels, where it is less apt to be damaged and at the same time serves to balance the weight of the gun mount at the forward end of the vehicle.

The motor 21 is provided with a radiator 23 over which air is adapted to be forced or drawn by a fan 22. The motor and associated parts are covered by a suitable hood 26. Suitable ventilating openings or grills, preferably in the upper portion of the end wall at 27, are provided. A suitable transmission 24 is located ahead of the motor and a drive shaft 25 transmits power from the transmission to the front and rear drives 20.

A revolvable base 30 is provided for the gun 31 by which the gun can be maneuvered about a vertical axis. The gun mount is also provided with a horizontal pivotal connection 29 so that the gun can be maneuvered for elevational firing. The gun 31 may be maneuverable about the horizontal and vertical axis for elevation and traverse angles by manual manipulation or by hydraulic means or both.

Seats 32 are provided rearwardly of the gun for the gunners. Rearwardly of the seats 32 are located a driver's seat 33 and an additional seat 34 for additional personnel. A suitable steering gear 36 is provided for the driver forwardly of the seat 33 together with the conventional motor controls (not shown).

To supply hydraulic pressure for the cylinders 14 and the gun mount, I provide a pump 41 which is driven by the motor 21. Suitable conduit connections as well as a valve 42 are provided with a control lever 43 convenient to the driver. A predetermined movement of the control lever 43 is adapted to release the pressure in the conduits leading to the cylinders 14 whereby the weight of the body is permitted to force actuation of the toggles at the four wheels to lower the body relative to the wheels. Another predetermined movement of the control 43 is adapted to build up the pressure in the cylinders 14 so as to actuate the toggles to lift the body 1 to the position indicated in Fig. 4. Obviously other fluids (such as air) might be employed in a power system for actuating the parts.

Likewise suitable hydraulic controls such as are well known to the ordnance may be provided for the gun 31 whereby the gun can be maneuvered by hydraulic pressure and kept ready for instant firing.

From the foregoing it will be clear that I have invented a vehicle adaptable to mount a relatively large gun which can be used for firing with the vehicle in motion or in stationary position. The independent suspension of the wheels provide ample space for wheel movement during travel so that the body of the vehicle is subjected to a minimum of vibration and jar for even high speed travel over rough terrain. The unsprung parts comprising the suspension are reduced to a minimum by the improved assembly and this is a desirable condition for reasons that are well appreciated in this art. The hydraulic toggle suspension of the body on the four wheels provides for instant lowering of the body to furnish a substantially solid firing foundation for the gun where accurate long range firing is required. This solid firing position for the gun helps it to hold on the target, the gun crew thereby being permitted to make quickly any necessary corrections in the aiming of the gun.

Where the vehicle is of trailer construction a small power operated pump or some form of manual pump can be provided to furnish the desired hydraulic pressure for the hydraulic controls of the gun mount and the hydraulic cylinders of the wheel suspensions.

It will also be seen that by the four torsion rod suspension of each wheel that the breakage of one or two of the bars will not disable the vehicle. Further, the relatively wide spread of the supporting brackets 5 permits the use of a relatively deep body which together with the ample wheel travel eliminates to a large degree the frame and body twisting heretofore experienced with vehicles in travel over rough terrain.

While I have shown but one embodiment of the invention it will be readily apparent to those skilled in the art that many variations and other embodiments are possible without departing from the invention. The vehicle, for example, may be built in any desired size to balance in proportions the size and capacity of the gun or guns selected for use therewith. Also additional wheels using the same type of independent suspension may be provided; and instead of four torsion spring bars two such bars only may be used per wheel or even other forms of resilient supports and toggle connections may be provided. It is to be understood therefore that the embodiment of the invention herein illustrated and described is intended to be illustrative only and not as limiting the scope of the appended claims.

I claim:

1. In mobile artillery having a gun mount, a frame supporting said gun mount and movable from a grounded firing position to a raised transport position, wheels, and means associated with each wheel for connecting and moving said wheels with respect to the frame to move the frame from one of said positions to the other, each of said means including a bearing yoke for the respective wheel, parallel arms connected to said yoke and movable about axes extending longitudinally of said frame, a torsion bar connected to at least one of said arms and movably mounted on said frame, a lever connected to said torsion bar, hydraulic means connected to said lever for actuating the same to raise and ground the frame with respect to the wheels, and shock absorbing means interposed between said lever and one of said arms.

2. In mobile artillery having a gun mount, a frame supporting said gun mount and movable from a grounded firing position to a raised transport position, wheels and means associated with each wheel for connecting and moving said wheels with respect to the frame to move the frame from one of said positions to the other, each of said means including a bearing yoke for the respective wheel, parallel arms connected to said yoke and movable about axes extending longitudinally of said frame, a torsion bar connected to at least one of said arms and movably mounted on said frame, a lever connected to said torsion bar, hydraulic means connected to said lever for actuating the same to raise and ground the frame with respect to the wheels, and shock absorbing means interposed between said lever and one of said arms and aligned with said hydraulic means.

3. In mobile artillery having a frame with a gun mount thereon and wheels for supporting said frame, means associated with each wheel for raising and lowering said frame and for supporting the frame as a sprung load, each of said means comprising a bearing yoke for the respective wheel, parallel arms connected to said bearing yoke and pivotally movable about axes extending longitudinally of said frame, torsion bars mounted on said frame and each connected at one end to a different one of said arms, lifting members connected to the opposite end of each of said bars, and hydraulic means connected to said lifting members and to the frame to actuate the lifting members and torsion bars to raise and lower the frame.

4. In mobile artillery having a frame with a gun mount thereon and wheels for supporting said frame, means associated with each wheel for raising and lowering said frame and for supporting the frame as a sprung load, each of said means comprising a bearing yoke for the respective wheel, parallel arms connected to said bearing yoke and pivotally movable about axes extending longitudinally of said frame, torsion bars mounted on said frame and each connected at one end to a different one of said arms, lifting members connected to the opposite end of each of said bars, hydraulic means connected to said lifting members and to the frame to actuate the lifting members and torsion bars to raise and lower the frame, and shock absorbing means interposed between one of said arms and one of said lifting members.

5. In mobile artillery having a frame with a gun mount thereon and wheels for supporting said frame, means associated with each wheel for raising and lowering said frame and for supporting the frame as a sprung load, each of said means comprising a bearing yoke for the respective wheel, a pair of arms each pivotally connected at one end to said yoke for movement about axes extending longitudinally of said frame, a pair of torsion bars mounted on said frame and having the opposite ends of said arms connected thereto, a lever connected to both of said torsion bars, and hydraulic means connected to said lever and to said frame for raising and lowering the wheels with respect to said frame.

6. In mobile artillery having a frame with a gun mount thereon and wheels for supporting said frame, means associated with each wheel for raising and lowering said frame and for supporting the frame as a sprung load, each of said means comprising a bearing yoke for the respective wheel, a pair of arms each pivotally connected at one end to said yoke for movement about axes extending longitudinally of said frame, a pair of torsion bars mounted on said frame and having the opposite ends of said arms connected thereto, a lever connected to both of said torsion bars, hydraulic means connected to said lever and to said frame for raising and lowering the wheels with respect to said frame, and a shock absorber connected between said lever and one of said arms.

7. In mobile artillery having a frame with a gun mount thereon and wheels for supporting said frame, means associated with each wheel for raising and lowering said frame and for supporting the frame as a sprung load, each of said means comprising a bearing yoke for the respective wheel, a pair of arms each pivotally connected at one end to said yoke for movement about axes extending longitudinally of said frame, a pair of torsion bars mounted on said frame and having the opposite ends of said arms connected thereto, a lever connected to both of said torsion bars, hydraulic means connected to said lever and to said frame for raising and lowering the wheels with respect to said frame, and a shock absorber connected between said lever and one of said arms and including elements movable in substantial alignment with said hydraulic means.

8. In mobile artillery having a frame with a gun mount thereon and wheels for supporting said frame, means associated with each wheel for raising and lowering said frame and for supporting the frame as a sprung load, each of said means comprising a bearing yoke for the respective wheel, a pair of arms each pivotally connected at one end to said yoke for movement about axes extending longitudinally of said frame, a pair of torsion bars mounted on said frame and having the opposite ends of said arms connected thereto, a second pair of arms and torsion bars connected and arranged similar to the first and positioned substantially parallel thereto, a lever connected to one pair of torsion bars and another lever connected to the other pair of torsion bars, a link connecting said levers, and hydraulic means connected to said link and to the frame to raise and lower the wheels with respect to the frame.

9. In mobile artillery having a frame with a gun mount thereon and wheels for supporting said frame, means associated with each wheel for raising and lowering said frame and for supporting the frame as a sprung load, each of said means comprising a bearing yoke for the respective wheel, a pair of arms each pivotally connected at one end to said yoke for movement about axes extending longitudinally of said frame, a pair of torsion bars mounted on said frame and having the opposite ends of said arms connected thereto, a second pair of arms and torsion bars connected and arranged similar to the first and positioned substantially parallel thereto, a lever connected to one pair of torsion bars and another lever connected to the other pair of torsion bars, a link connecting said levers, hydraulic means connected to said link and to the frame to raise and lower the wheels with respect to the frame, and shock absorbing means connected to said link and one of said arms to cushion the movement thereof.

MAURICE WALTER.